US006661338B2

(12) United States Patent
Holthaus

(10) Patent No.: US 6,661,338 B2
(45) Date of Patent: Dec. 9, 2003

(54) EXIT LIGHTING SYSTEM FOR OFF-ROAD VEHICLE

(75) Inventor: Shawn A. Holthaus, Eldridge, IA (US)

(73) Assignee: Case, LLC, Racine, WI (US)

( * ) Notice: Subject to any disclaimer, the term of this patent is extended or adjusted under 35 U.S.C. 154(b) by 308 days.

(21) Appl. No.: 09/784,596

(22) Filed: Feb. 15, 2001

(65) Prior Publication Data
US 2002/0118547 A1 Aug. 29, 2002

(51) Int. Cl.$^7$ .............................................. G08B 25/00
(52) U.S. Cl. .................. 340/309.15; 340/431; 340/684; 340/309.16; 340/691.1; 200/302.3; 200/61.34; 200/61.35; 200/5 A
(58) Field of Search ........................... 340/309.15, 431, 340/684, 309.16, 691.1; 200/302.3, 61.34, 61.35, 5 A

(56) References Cited

U.S. PATENT DOCUMENTS

| | | | | |
|---|---|---|---|---|
| 3,903,429 A | * | 9/1975 | Heffel | 307/10.7 |
| 5,321,309 A | * | 6/1994 | Kolomyski | 307/10.8 |
| 5,442,527 A | | 8/1995 | Wichelt | 362/61 |
| 5,498,929 A | | 3/1996 | Formwalt, Jr. | 315/77 |
| 5,602,427 A | * | 2/1997 | Dimitriev | 307/10.8 |
| 5,811,729 A | * | 9/1998 | Rintz | 174/66 |
| 5,855,108 A | | 1/1999 | Salz et al. | 56/10.2 G |
| 6,002,330 A | | 12/1999 | Brandt | 340/468 |

OTHER PUBLICATIONS

John Deere Operator's Manual, 9650 STS and 9750 STS Combines, OMH16186 Issue G9 (Date Unknown).
Technical Description of M511.152 Rocker Switch (Date Unknown).

* cited by examiner

Primary Examiner—Daniel J. Wu
Assistant Examiner—Tai T. Nguyen
(74) Attorney, Agent, or Firm—Rebecca Henkel

(57) ABSTRACT

A lighting system for an off-road vehicle includes one or more exit lights that are activated upon operator demand and that are automatically deactivated a designated period of time after exit lights activation, thereby facilitating the operator's departure from the vehicle. The lighting system includes an electrical power source, at least one running light, at least one exit light, and a control system that is coupled to the power source and to the lights and that controls operation of the running light and the exit light. The control system includes a manually operated switch movable between (1) an OFF position in which neither the running light nor the exit light is coupled to the power source, (2) a running light activation position in which at least the running light is coupled to the power source, and (3) an exit light activation position. A timer is operatively coupled to the switch and to the exit light and is operable, in response to selection of the exit light activation position of the switch, to couple the exit light to the power source for a designated period of time. Because exit light activation occurs under operator control rather than automatically, and because exit light activation is not necessarily preceded by running light deactivation or any other operation, the operator is imbued with a sense of control not experienced with other exit light control systems.

26 Claims, 3 Drawing Sheets

EXIT LIGHTING SYSTEM FOR OFF-ROAD VEHICLE

BACKGROUND OF THE INVENTION

1. Field of the Invention

The invention relates to lighting systems and, more particularly, relates to an exit light control system configured to illuminate an operator's way during departure from an off-road vehicle. The invention additionally relates to an off-road vehicle, such as an agricultural combine, incorporating such an exit light control system, and to a method of operating such an exit light control system.

2. Background of the Invention

Most off-road vehicles incorporate lighting systems enabling them to be operated at night. For example, backhoes, bulldozers, tractors, and combines all incorporate a system of running lights that illuminate the areas in front, behind, and/or beside the vehicle. Most of these vehicles are controlled by an operator seated in a station located a substantial height above the ground. The station typically comprises a platform or a cab accessible via an access ladder extending from the station to the ground.

Many off-road vehicles incorporate exit light control systems that facilitate an operator's departure from the vehicle. The typical exit light control system is configured to activate one or more exit lights on the vehicle to illuminate an area adjacent one or both sides of the vehicle for a period of time after the operator "parks" (i.e., turns off) the vehicle and/or the vehicle's running lights. The exit lights provide a clear line of sight to permit the operator to climb down the access ladder and to walk away from the vehicle. The exit lights usually comprise side flood lamps located adjacent one or both sides of the vehicle. Exit lighting systems of this type are particularly beneficial in agricultural vehicles, such as tractors and combines, because those vehicles are often parked in the field at night at a substantial distance from the nearest illuminated area. In addition, the operator of this type of vehicle often parks the vehicle in a field or at another location in which he or she is unsure of the characteristics of the ground on which the vehicle is parked. By illuminating the area adjacent the vehicle, the operator can depart the vehicle with confidence that it is safe to do so.

Known exit light control systems are configured to automatically activate the vehicle's exit lights. In this type of system, the vehicle's light switch is coupled to a controller that activates the exit lights for a designated period of time (typically about 30 seconds) when the operator selects an OFF position of the vehicle's light switch. This type of automatically-triggered system can be a nuisance to an operator who is unfamiliar with it. The unfamiliar operator may turn off the lights, dismount from the vehicle, and begin to walk away from the vehicle before he or she notices that the exit lights are activated. The unsuspecting operator's natural reaction is to assume that he or she forgot to turn off the running lights and to return to the vehicle to turn off the lights. An operator laboring under this misconception will likely partially or completely finish the return trip to the operator's station before the exit lights deactivate themselves. The operator then must either reactivate the exit light control system (assuming he or she knows how to do so) or dismount from the vehicle in the dark. Both alternatives are unattractive.

Another problem associated with the typical exit light control system available today is that the same programmed controller that controls the vehicle's running lights operates the exit lights. Retrofitting an exit light control system into a vehicle of this type requires reprogramming and/or replacing the existing controller. Neither task is easily performed by unskilled personnel. In addition, exit light control systems of this type cannot be incorporated into vehicles lacking a programmed controller.

Yet another problem associated with known exit light control systems is that they require that the running lights be activated for at least a period of time before the exit lights are activated. This requirement to operate the lighting controls in a particular sequence undesirably prevents the operator from dismounting from the vehicle without ever activating the running lights. Simply put, the operator lacks an adequate sense of control over the vehicle.

The need therefore has arisen to provide an exit light control system for an off-road vehicle that gives the vehicle's operator a sense of control over operation of the vehicle's exit lights.

The need also has arisen to provide an exit light control system for an off-road vehicle that can be easily retrofitted into an existing vehicle design or even into an existing vehicle.

The need has also arisen to provide an improved method of lighting area(s) adjacent an off-road vehicle while an operator dismounts from the vehicle.

SUMMARY OF THE INVENTION

In accordance with a first aspect of the invention, a lighting system for an off-road vehicle includes one or more exit lights that are activated upon operator demand and that are to automatically deactivated a designated period of time after activation, thereby facilitating the operator's departure from the vehicle. The lighting system includes an electrical power source, at least one running light, at least one exit light, and a control system that is coupled to the power source and to the lights and that controls operation of the running light and the exit light. The control system includes a manually operated switch movable between (1) an OFF position in which neither the running light nor the exit light is coupled to the power source, (2) a running light activation position in which at least the running light is coupled to the power source, and (3) an exit light activation position. A timer is operatively coupled to the switch and to the exit light and is operable, in response to selection of the exit light activation position of the switch, to couple the exit light to the power source for a designated period of time.

The switch is preferably of standard dimensions, and all exit light control system components are preferably configured to be compatible with an existing running light control system, thereby permitting the control system to be retrofitted into an existing running light control system design by unskilled personnel.

Preferably, the OFF position of the switch is located between the running light activation position and the exit light activation position in a direction of switch movement. For instance, the switch may be a rocker switch in which the OFF position is a center position, the running light activation position is a first end-depressed position, and the exit light activation position is a second end-depressed position. In order to provide a momentary-on characteristic in its operation, the rocker switch is not latchable in the second-end depressed position but, instead, is biased toward the center position from the second-end depressed position.

In accordance with another aspect of the invention, a method of facilitating an operator's departure from an off-road vehicle comprises manually selecting a running light activation position of a switch to activate running lights of an off-road vehicle, manually selecting an exit light activation position of the switch, and, in response to selection of the exit light activation position of the switch, activating an exit light of the vehicle for a designated period of time, and then automatically deactivating the exit light. Because exit light activation occurs under operator control rather than automatically, and because exit light activation is not necessarily preceded by running light deactivation or any other operation, the operator is imbued with a sense of control not experienced with other exit light control systems.

Preferably, a timer is triggered upon selection of the exit light activation position of the switch to supply electrical power to the exit light for a period of time set by the timer.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. System Overview

As discussed above, the inventive exit light control system is usable with a variety of industrial and agricultural vehicles. It is particularly well-suited for use with vehicles that 1) incorporate an operator's station located a substantial distance above the ground, 2) are often operated at night, and 3) are often parked at locations remote from the nearest illuminated area. Vehicles exhibiting these characteristics include, but are in no way limited to, backhoes, bulldozers, agricultural tractors, and agricultural combines. Hence, while the invention will now be described in conjunction with a combine, it is to be understood that it is usable on a variety of other off-road vehicles as well.

Figure 1:
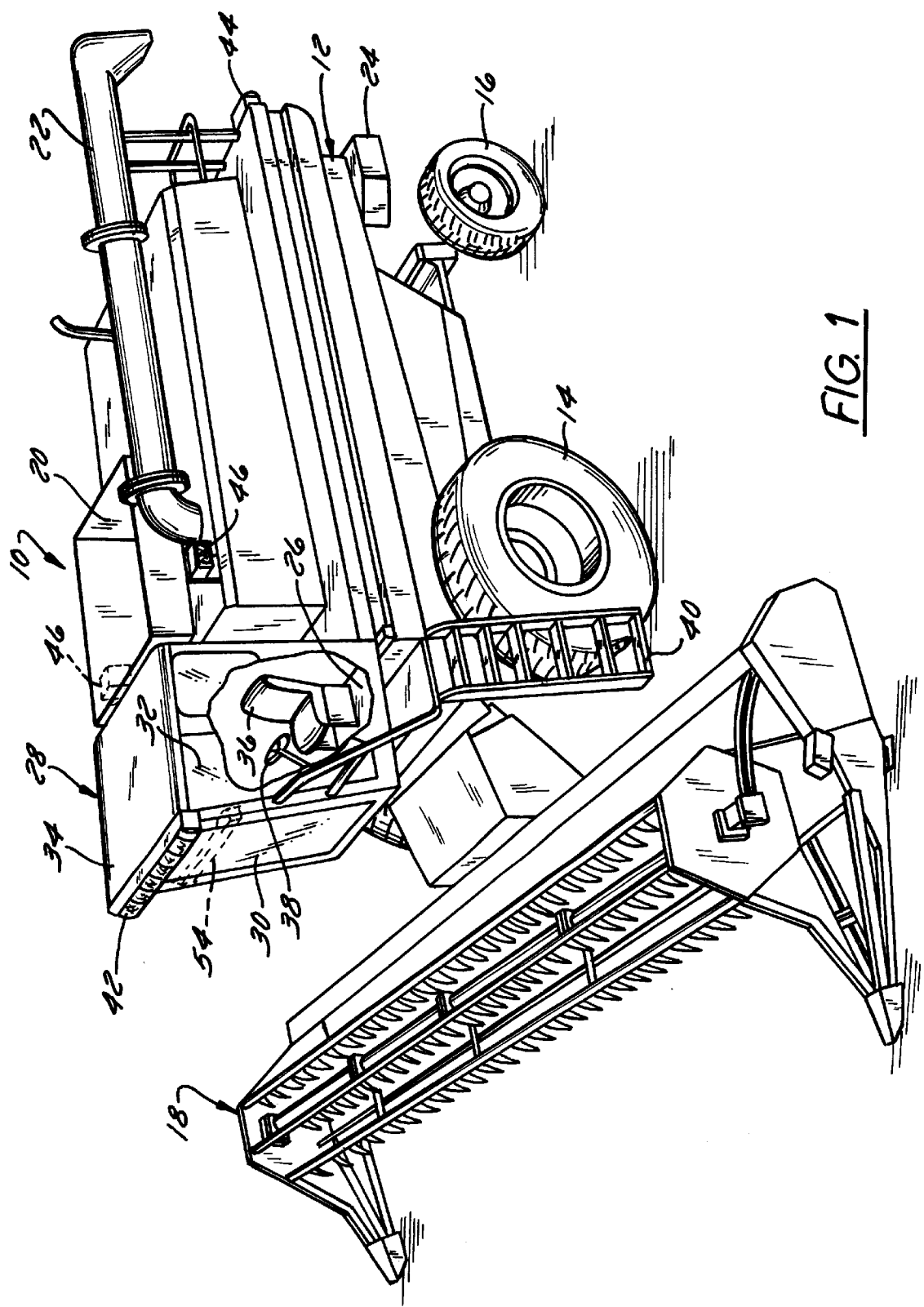
FIG. 1 is a somewhat schematic, perspective view of a combine incorporating an exit light control system constructed in accordance with a preferred embodiment of the present invention.

Referring now to the drawings and initially to FIG. 1 in particular, an agricultural combine 10 is illustrated that incorporates an exit light control system constructed in accordance with a preferred embodiment of the invention. Except for the exit light control system, the combine 10 is at least essentially conventional. It includes a self-propelled chassis 12 supported on the ground via a pair of relatively large front driving wheels 14 and a pair of relatively small rear steering wheels 16. A replaceable harvesting head 18 is mounted on the front of the chassis 12 for harvesting the crop of interest. The illustrated harvesting head 18 is a so-called "grain head" configured to harvest soybeans, wheat, oats, or the like. In most combines, the grain head 18 can be replaced with another harvesting head such as a so-called "corn head" configured to detach ears of corn from stalks. The combine 10 is operable to feed the harvested grain from the head 18 to internal thrashers and separators (not shown) that separate the grain from stalks, pods, cobs, etc. (collectively referred to herein as chaff.) A storage hopper 20 stores the harvested grain. Finally, an auger 22, mounted on top of the combine 10, conveys the harvested grain to a wagon, another auger, or another storage and/or transfer device or facility. In addition, a chaff spreader (shown generally at 24) is located at the rear of the combine 10 for chopping the chaff and/or spreading it on the ground.

The combine 10 is controlled by an operator stationed in an operator's station. In the illustrated embodiment, the operator's station comprises a platform 26 located within a cab 28. The cab 28 (1) is enclosed by walls including front and side walls 30 and 32, (2) is covered by a roof 34, and (3) is accessible via a door (not shown) on the left side of the cab 28. The cab 28 houses a seat 36, a steering wheel 38, and a variety of controls that are accessible by the operator to control all of the combine's operations. A ladder 40 extends downwardly from the operator's platform 26 toward the ground at a location near the left front tire 14. Some combines also incorporate other, less substantial, ladder(s) (not shown) at other locations on the combine 10 to provide access to equipment on those locations for repair, maintenance, etc.

Running lights 42, 44 and flood lamps 46 are mounted on the combine 10 to permit nighttime operation. The running lights typically include at least headlamps 42 and rear lamps 44. The headlamps 42 are provided in a line extending horizontally across the upper end of the front wall 30 of the cab 28. They are configured to illuminate the head 18 and the area in front of it. The rear lamps 44 (only one of which is shown) are mounted on the rear end of the combine 10 and illuminate an area behind the combine 10 to permit the operator to monitor the spreading of chaff on the ground and other activities occurring behind the combine. The flood lamps 46, are mounted on or near the left and right sides of the combine 10 and illuminate areas adjacent those sides.

2. Construction and Operation of Exit Light Control System

Figure 4:
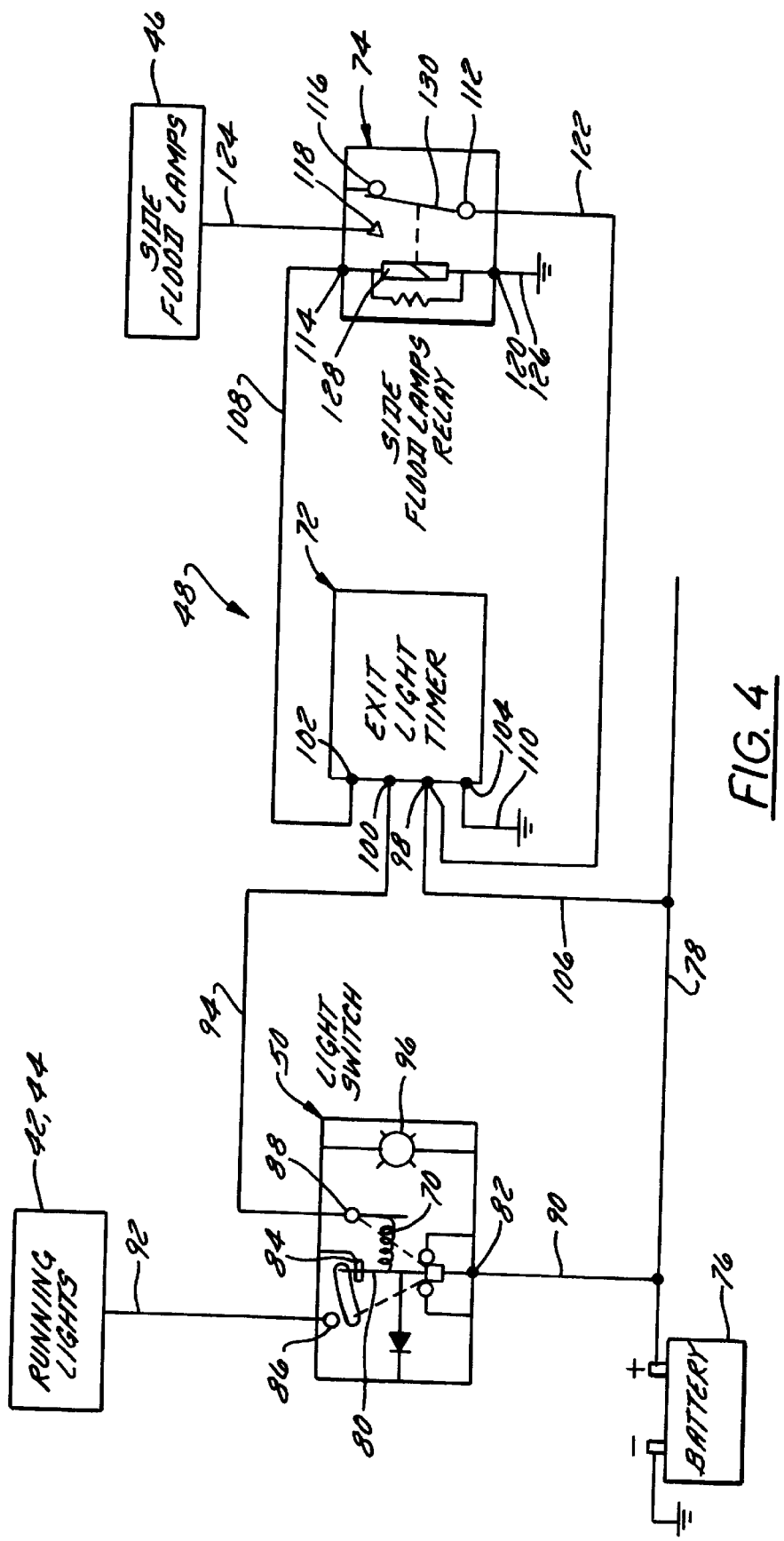
FIG. 4 is a circuit diagram of the exit light control system.

The lights 42, 44, and 46 are controlled by an exit light control system 48 (FIG. 4). System 48 is configured to activate the running lights 42 and 44 and possibly other lights on the combine 10 during normal nighttime operation and to activate or continue to activate at least one "exit light" for a sufficient period of time after the combine 10 is parked to permit the operator to dismount from the combine 10 and walk away from it. Advantageously, system 48 may also (1) be configured to be usable in lighting systems that do not have programmed controllers and (2) be easily retrofittable into an existing lighting system design and possibly even into an existing vehicle. In the illustrated embodiment, the exit lights that are activated after the vehicle is parked comprise only the side flood lamps 46. It is conceivable, however, that other lights could be activated at this time in addition to or instead of the flood lamps 46. For instance, lights could be provided on or very near the ladder 40 to more specifically illuminate the ladder 40 and other areas on and adjacent the operator's platform 26. In addition, if the exit light control system 48 were to be used on a tractor or another vehicle having an access latter at the rear of the vehicle, the exit lights would comprise the vehicle's rear light(s).

Figure 2:
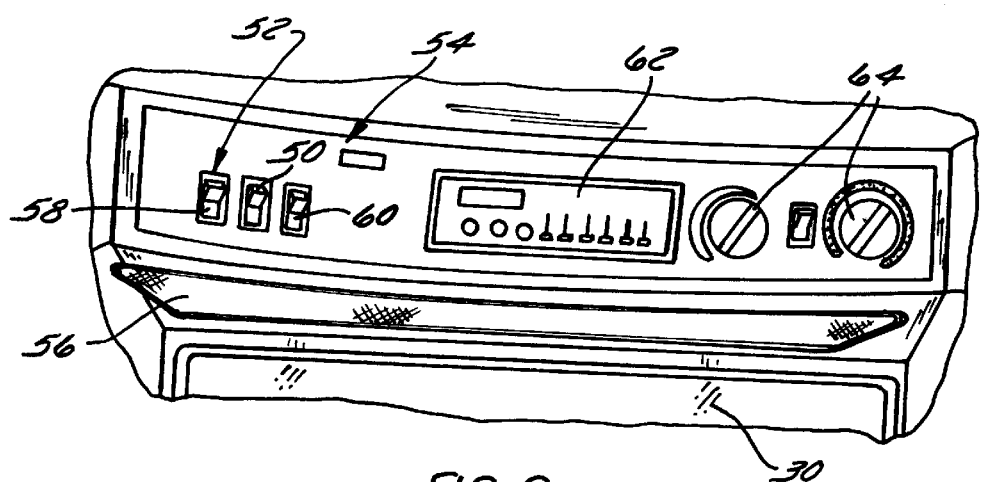
FIG. 2 is a front elevation view of a control panel of the combine of FIG. 1 that incorporates a switch of the exit light control system.

In order to permit the operator to control at least most aspects of the combine's exterior lighting with a single switch, the exit light control system 48 is controlled by the same switch 50 used to operate the vehicle's running lights. That switch 50 should be mounted in a location which is readily accessible by the operator seated on the seat 36. Referring to FIG. 2, a suitable location for the switch 50 is on a control panel 52 mounted on a front headliner 54 of the combine 10. The front headliner 54 is located on the inside surface of the front wall 30 of the cab 28 at a location just above an operator's sun visor 56. The control panel 52 supports a variety of switches, instruments, and other controls in addition to the light switch 50. For instance, in the illustrated embodiment, the control panel 52 may also support a hazard warning switch 58, a windshield wiper switch 60, a radio 62, environmental controls 64, etc.

The switch 50 of the preferred embodiment is movable between an OFF position, a running light activation position, and an exit light activation position. No lighting circuits are activated when the switch's OFF position is selected. All running lights 42, 44 (and possibly the flood lamps 46 as well) are activated when the running light activation position is selected and remain activated for so long as the switch 50 is in its running light activation position. The exit lights are activated when the exit light activation position is selected but are automatically deactivated a designated period of time after that position is selected. This aspect of the system 48 prevents the exit lights from being inadvertently left on for extended periods of time. A variety of multi-way switches are capable of operating in this manner. Dial switches, multi-position toggle switches, and push-button switches are all acceptable. However, a rocker switch is currently preferred.

Figure 3:
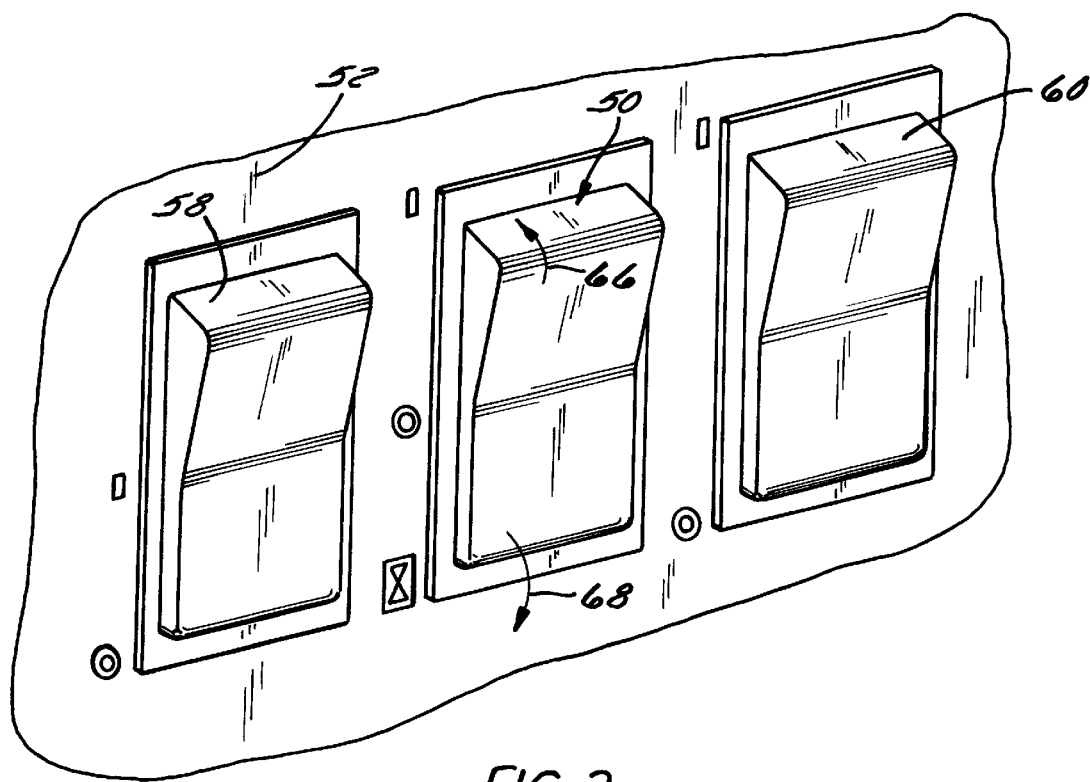
FIG. 3 is a fragmentary perspective view of a portion of the control panel of FIG. 2.

Referring now to FIG. 3, one possible rocker switch 50 usable in the control system 48 of FIG. 4 is a three-position rocker switch that is mounted in an access opening in the control panel 52. For purposes of aesthetics and convenience, the switch 50 can be of the same dimensions as the other switches 58 and 60 on the control panel 52 and located in line with the other switches 58 and 60. By using a rocker switch of conventional dimensions, the switch 50 can be more easily incorporated into an existing instrument package. Indeed, because most off-road vehicles now employ rocker switches as their light switches, the switch 50 can simply replace the existing light switch in retrofit applications by unskilled personnel. As is conventional in switches of this type, the switch 50 includes a center neutral position, a first end-depressed position obtainable by depressing the switch 50 in the direction of arrow 66 in FIG. 3, and a second end-depressed position obtainable by depressing the switch in the direction of arrow 68 in FIG. 3. The center position corresponds to the OFF position of the switch 50. The first end-depressed position corresponds to the running light activation position, and the second end-depressed position corresponds to the exit light activation position. In order to meet the desired design criteria discussed in the preceding paragraph, the switch 50 is latchable in either its OFF position or its running light activation positions but is biased from its exit light activation toward its OFF position by an internal spring 70 (FIG. 4).

The circuitry of the exit light control system 48 may take any of a variety of forms. If the exit light control system is incorporated into a vehicle having a programmed controller, the exit light control functions could simply be programmed into that controller. A hard-wired circuit is preferred in the illustrated embodiment in which the exit light control system is designed for use in a vehicle lacking a programmed controller but having a preexisting lighting control system. Referring to FIG. 4, the preferred hard wired system 48 includes the switch 50, a timer 72, and a side flood lamp relay 74, all of which are coupled to a power source such as a battery 76 via a main supply line or cable 78. The internal connections of these components and the manner in which they are coupled to one another will now be detailed.

Still referring to FIG. 4, the switch 50 includes an internal contact 80 that is movable to connect an input terminal 82 to one of first, second, and third output terminals 84, 86, 88, depending upon the position of the contact 80. The input terminal 82 is connected to the cable 78 by a wire 90. The first or center output terminal 84 corresponds to the neutral or OFF position of the switch 50 and is not connected to any other powered circuits. The second or first end output terminal 86 corresponds to the running light activation position of the switch 50 and is coupled to the running lights 42, 44 via a wire 92. The third or second end output terminal 88 corresponds to the exit light activation position of the switch 50 and is connected to a triggering input terminal 100 of the exit light timer 72 via a wire 94. If the switch 50 is backlit, a backlight 96 may be provided in the switch 50 and coupled directly to the input and output sides of the switch 50.

The exit light timer 72 may comprise any of a variety of settable or non-settable timers that are operable, upon receiving a triggering input signal from the switch 50, to supply a triggering output signal to another device (in this case the side flood lamp relay 74) for a period of time set by the timer 72. The illustrated timer 72 includes first and second input terminals 98, 100, an output terminal 102, and a ground terminal 104. The first input terminal 98 is as driving power input terminal connected to the cable 78 by a wire 106. The second input terminal 100 is triggering input terminal connected to the third output terminal 88 of the switch 50 via the wire 94. The output terminal 102 is connected to the side flood lamp relay 74 via a wire 108 as described is greater detail below. Finally, the ground terminal 104 is connected to ground via a ground wire 110. As is conventional, the timer 72 includes internal circuitry that couples the driving power input terminal 98 to the output terminal 102 for a designated period of time upon receipt of an energizing pulse from the switch 50. If the side flood lamps 46 are also to be operated with the running lights 42, 44, the output terminal 102 could also be connected to the energizing circuit for the running lights 42, 44, either directly via a connection to the wire 92 or to the terminal 86 or indirectly via intermediate connections.

The side flood lamp relay 74 is unnecessary in applications in which the side flood lamps 46 are capable of being powered directly by the wire 108. In the embodiment illustrated in FIG. 4 in which a relay is necessary or at least desired, the relay 74 has first and second input terminals 112 and 114, first and second output terminals 116 and 118, and a ground terminal 120. The first input terminal 112 is permanently supplied with energizing power by a wire 122 coupled to the cable 78 either directly or, as in the illustrated embodiment, by being connected to the driving power terminal 98 of the exit light timer 72. The second input terminal 114 is connected to the output terminal 102 of the exit light timer 72 by the wire 108. The first output terminal 116 is a neutral terminal that is not connected to any powered circuit, and the second output terminal 118 is connected to the side flood lamps 46 by a system of wires collectively denoted 124. The ground terminal 120 is connected to ground via a ground wire 126.

The relay 74 is a normally-open relay. It has an electromagnet 128 that is closed when energizing current is supplied to the second input terminal 114 to move a contact 130 (1) from the position illustrated in FIG. 4 in which it connects the first input terminal 112 to the first or neutral output terminal 116 (2) to the non-illustrated position in which it connects the first input terminal 112 to the second output terminal 118 to supply electrical power to the side flood lamps 46. As is conventional with relays of this type, the contact 130 is biased towards the illustrated position. Hence, when power is no longer supplied to the electromagnet 128, the contact 130 automatically returns to the position illustrated in FIG. 4 to deactivate the flood lamps 46.

In use, when an operator stationed within the cab 28 wishes to activate the combine's running lights 42, 44 for nighttime operation, he or she selects the running light activation position of the switch 50, thereby coupling the input terminal 82 of the switch to the second output terminal 86 to activate the running lights 42, 44. The switch 50 is latched in that position after the operator releases it. The running lights 42, 44 therefore remain activated until the operator again engages the switch 50. When the operator wishes to park the combine 10, he or she may deactivate all lights by pressing the switch 50 to its center or OFF position, thereby coupling the input terminal 82 of the switch 50 to the first or neutral output terminal 84 and deactivating all lights. Conversely, the operator may choose to activate the exit lights (the side flood lamps 46 in this embodiment) by depressing the switch 50 beyond its center position to its second-end depressed position, thereby connecting the input terminal 82 to the third output terminal 88. This operation triggers the exit light timer 72, thereby tripping the side flood lamp relay 74 to supply electrical power to the side flood lamps 46. Although the switch 50 returns to its center OFF position under the return force of the internal spring 70 immediately upon operator release of the switch 50, the relay 74 will remain in its closed position for a period of time designated by the timer 72. That time period is set to provide the operator with adequate time to exit the cab 28, climb down the ladder 40, and walk away from the combine 10 while remaining within the area illuminated by the side flood lamps 46. Typical time periods are between 15 seconds and one minute, most typically about 30 seconds. At the end of this time period, the timer 72 shuts down to discontinue the supply of electrical power to the relay 74, thereby deactivating the side flood lamps 46.

Due to the design of the exit light control system 48, the running lights 42, 44 need not necessarily be activated before the exit lights are system is activated. The operator could instead simply select the exit light activation position of the switch 50 without ever activating the running lights, in which case the timer 72 would be triggered and the flood lamps 46 would be illuminated for the period of time set by the timer 72. This versatility instills the operator with a highly-developed sense of control over all major aspects of the operation of the exit light control system 48. In addition, because the operator must make a conscious decision to activate the side flood lamps forming the exit lights, he or she is not surprised when those lights remain on after he or she dismounts from the combine 10.

Many changes and modifications may be made to the invention without departing from the spirit thereof. The scope of some of these changes are discussed above. The scope of the remaining changes will become apparent from the appended claims.

I claim:

1. A lighting system for an off-road vehicle comprising:
    (A) an electrical power source;
    (B) at least one running light;
    (C) at least one exit light that illuminates an area proximal a dismount location on the vehicle; and
    (D) a control system that is coupled to said power source and to said lights and that controls operation of the running light and the exit light, said control system including
        (1) a manually operated switch movable between
            (a) an OFF position in which neither said running light nor said exit light is coupled to said power source,
            (b) a running light activation position in which at least said running light is coupled to said power source, and
            (c) an exit light activation position, and
        (2) a timer that is operatively coupled to said switch and to said exit light, said timer being operable, in response to selection of said exit light activation position of said switch, to couple said exit light to said power source for a designated period of time.

2. The lighting system as recited in claim 1, wherein the running light comprises at least one of a headlamp and a rear lamp.

3. The lighting system as recited in claim 1, wherein said exit light comprises at least one of a left-side flood lamp and a right-side flood lamp.

4. The lighting system as recited in claim 1, wherein said OFF position of said switch is located between said running light activation position and said exit light activation position in a direction of switch movement.

5. The lighting system as recited in claim 4, wherein said switch is a rocker switch in which said OFF position is a center position, said running light activation position is a first end-depressed position, and said exit light activation position is a second end-depressed position.

6. The lighting system as recited in claim 5, wherein said rocker switch is not latchable in said second-end depressed position and is biased toward said center position from said second-end depressed position.

7. The lighting system as recited in claim 1, wherein said switch is not latchable in said exit light activation position and is biased toward said OFF position from said exit light activation position.

8. The lighting system as recited in claim 1, wherein said control system further comprises an exit light relay located between said timer and said exit light, said exit light relay being activated by said timer to couple said exit light to said power source.

9. A lighting system for an off-road vehicle comprising:
    (A) an electrical power source;
    (B) a system of running lights including at least one headlamp;
    (C) at least one side flood lamp; and
    (D) a control system that is coupled to said power source, to said running lights, and said side flood lamp and that controls operation of said running lights and said side flood lamp, said control system including
        (1) a manually-operated switch movable between
            (a) an OFF position in which neither said running lights nor said side flood lamp are coupled to said power source,
            (b) a running light activation position in which at least said running lights are coupled to said power source, and
            (c) an exit light activation position, wherein said OFF position is located between said running light activation position and said exit light activation position in a direction of switch movement, and wherein said switch is not latchable in said exit light activation position and is biased toward said OFF position from said exit light activation position, and (2) a timer that is operatively coupled to said switch and to said side flood lamp, said timer being operable, in response to selection of said exit light activation position of said switch, to couple at least said side flood lamp to said power source for a designated period of time.

10. The lighting system as recited in claim 9, wherein said switch is a rocker switch in which said OFF position is a center neutral position, said running light activation position is a first end-depressed position, and said exit light activation position is a second end-depressed position.

11. The lighting system as recited in claim 10, wherein said control system further comprises a side flood lamp relay which is operatively coupled to said timer and said side flood lamp, said side flood lamp relay being activated by said timer to couple said side flood lamp to said power source.

12. An exit light control system for controlling an off-road vehicle lighting system that includes at least one running light and at least one exit light that illuminates an area adjacent a dismount location on the vehicle, said exit light control system comprising:

(A) a manually-operated switch that is movable between
  (1) an OFF position,
  (2) a running light activation position in which at least said running light is activated, and
  (3) an exit light activation position; and (B) a timer that is operatively coupled to said switch and that is configured to be coupled at least to the exit light, wherein said switch and said timer are coupled to one another and configured such that, when said exit light control system is incorporated into the off-road vehicle lighting system, selection of said OFF position of said switch deactivates the running lights and selection of said running light activation position of said switch activates at least the running lights, and selection of said exit light activation position of said switch activates at least the exit light for a designated period of time determined by said timer.

13. The system as recited in claim 12, further comprising a relay which is operatively coupled to said timer and which is configured such that, when said exit light control system is incorporated into the off-road vehicle, said relay is tripped by said timer to connect the exit light to an electrical power source.

14. An off-road vehicle, comprising:

(A) a self-propelled chassis;
(B) an operator's station that is mounted on said chassis;
(C) an electrical power source;
(D) at least one running light that is supported on said chassis;
(E) at least one exit light that is supported on said chassis in the vicinity of said operator's station and that is operable to illuminate an area adjacent said operator's station; and
(F) a lighting control system that is coupled to said power source and to said lights and that controls operation of said running light and said exit light, said lighting control system including
  (1) a manually-operated switch movable between
    (a) an OFF position in which neither said running light nor said exit light is coupled to said power source,
    (b) a running light activation position in which at least said running light is coupled to said power source, and
    (c) an exit light activation position, and
  (2) a timer that is operatively coupled to said switch and to said exit light, said timer being operable, in response to selection of said exit light activation position of said switch, to couple said exit light to said power source for a designated period of time.

15. The vehicle as recited in claim 14, wherein said OFF position of said switch is located between said running light activation position and said exit light activation position in a direction of switch movement.

16. The vehicle as recited in claim 15, wherein said switch is not latchable in said exit light activation position and is biased toward said OFF position from said exit light activation position.

17. The vehicle as recited in claim 14, wherein said lighting control system further comprises an exit light relay located between said timer and said exit light, said exit light relay being activated by said timer to couple said exit light to said power source.

18. The vehicle as recited in claim 14, wherein said operator's station comprises a cab that is supported on the chassis and that is accessible by an operator via a ladder located beside said cab and extending towards the ground, and wherein said exit light comprises a side flood lamp.

19. The vehicle as recited in claim 14, wherein said vehicle is a combine.

20. A method for operating a lighting system for an off-road vehicle, comprising:

(A) manually selecting a running light activation position of a switch to activate running lights of the off-road vehicle;
(B) manually selecting an exit light activation position of said switch to illuminate an area proximal a dismount location on the vehicle;
(C) in response to selection of said exit light activation position of said switch, activating an exit light of said vehicle for a designated period of time and then automatically deactivating said exit light after expiration of said designated period of time.

21. The method as recited in claim 20, further comprising manually releasing said switch after selecting said exit light activation position of said switch, and then automatically moving said switch to an OFF position.

22. The method as recited in claim 21, further comprising manually moving said switch through said OFF position when manually selecting said exit light activation position when said switch is in said running light activation position.

23. The method as recited in claim 20, wherein the manually selecting steps comprise pressing a rocker switch having a center-neutral position corresponding to an OFF position thereof, a first end-depressed position corresponding to said running light activation position thereof, and a second end-depressed position corresponding to said exit light activation position thereof.

24. The method as recited in claim 20, wherein the step (C) comprises triggering a timer to supply electrical power to said exit light for a period of time set by said timer.

25. The method as recited in claim 24, wherein electrical power is supplied to said exit light by tripping a relay coupling said exit light to an electrical power source.

26. The method as recited in claim 20, further comprising deactivating said running light in response to mutually selecting said exit light activation position when said switch is in said running light activation position.

* * * * *